United States Patent Office 3,453,653
Patented July 1, 1969

3,453,653
INERTIAL HEIGHT SENSING SYSTEM
Kenneth E. Pope, Litchfield Park, Ariz., assignor to UMC Industries, Inc., a corporation of Missouri
Filed Jan. 30, 1967, Ser. No. 612,648
Int. Cl. G01c 21/00; G01p 17/00
U.S. Cl. 73—178                    8 Claims

ABSTRACT OF THE DISCLOSURE

An accelerometer output is compared with the output of an oscillator to obtain a difference signal which is used to correct a stored representation of an altitude reference. The altitude reference is decremented by the output of the oscillator to ultimately yield a real time indication of altitude during a missile's flight.

BACKGROUND OF THE INVENTION

This invention pertains to height sensing systems, and more particularly to a system for inertially determining the height of a missile as it follows its trajectory to thereby permit the programming of arming and fusing actions.

When a missile is launched, the theoretical trajectory may be ascertained with substantial precision from known ballistic parameters; such quantities as angle of launch, velocity, and apogee are usually known factors. The drag exerted on the missile causes substantial deviations from the known parameters and the actual trajectory will thus deviate from theoretical. A variety of solutions to this problem may be called upon utilizing complicated and sometimes bulky equipment. Such approaches as the calculation of drag and compensation therefor may be used. Such calculations are usually approximations and deviations can occur unless great skill is exercised in the determination of the parameter.

SUMMARY OF THE INVENTION

It is therefore an object of the present invention to provide a height sensing system based upon the utilization of accelerometer techniques.

It is also an object of the present invention to provide a height sensing system utilizing inertial components.

It is still another object of the present invention to provide an inertial height sensing system wherein an accelerometer output is combined with a predetermined signal to generate a correction signal to compensate for the difference between theoretical and actual trajectory.

These and other objects of the invention will become apparent to those skilled in the art as the description thereof proceeds.

Briefly, in accordance with one embodiment of the invention, an oscillator is utilized to provide pulses of a predetermined frequency. These pulses are applied to a counter which has previously been loaded to a value representing a desired reference altitude. The pulses decrement the counter to thereby provide an output signal from the counter when the desired count is reached. A pulse-producing accelerometer is connected to a difference generator, the latter also receiving pulses from the oscillator. The resulting combination of pulses from the accelerometer and oscillator produces correcting pulses which may be used to inhibit the counting of the counter to effect a correction corresponding to the difference in altitude between the theoretical and actual trajectories at any given time.

BRIEF DESCRIPTION OF THE DRAWINGS

The present invention may more readily be described by reference to the accompanying drawings, in which.

DETAILED DESCRIPTION OF THE DRAWINGS

Figure 1:
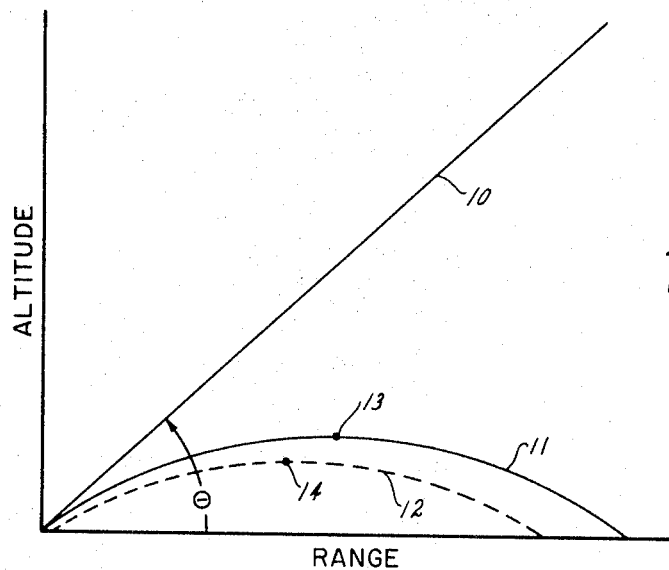
FIGURE 1 is a diagram illustrating the relationship between a theoretical or vacuum trajectory and an actual trajectory, together with the relationship of both trajectories to a theoretical inertial response line.

Referring to FIGURE 1, a simplified diagram is shown in which the abscissa represents units of range and the ordinate represents units of altitude. A theoretical line 10 represents the inertial response line of an accelerometer. An inertial accelerometer of the type used in the system of the present invention is disclosed in United States Patent No. 2,861,789, Pope. The accelerometer therein described provides a means for detecting acceleration along a predetermined axis; the output of the accelerometer may comprise a series of pulses the rate of which represents the velocity of the accelerometer along the acceleration axis. Thus, the inertial response line 10 represents the acceleration axis or physical orientation of the accelerometer; it may be noted that the inclination of the inertial response line 10 with the horizontal is represented by the angle $\theta$. If the accelerometer is mounted within a missile and oriented so that the acceleration axis corresponds to longitudinal axis of the missile, the angle $\theta$ will also be the launch angle of the missile.

A theoretical or vacuum trajectory 11 is shown in FIGURE 1 and represents the trajectory of a missile traveling in a vacuum; similarly, the trajectory 12 represents a missile trajectory having the same parameters as the trajectory 11 with the addition of air drag. The apogee of the theoretical trapectory is shown at point 13 while the apogee of the actual trajectory is shown at point 14.

Since the output pulses of the accelerometer, as described above, have a pulse rate indicative of velocity along the inertial response line, the distance sensed by the accelerometer along the inertial response line may be determined by the integration of the pulses. The range of the missile at apogee is thus the distance sensed bp the accelerometer along the inertial response line times the cosine of the launch angle $\theta$. The sine of the launch angle $\theta$ is proportional to the apogee of the missile. Since the accelerometer is zero g. referenced (acceleration of gravity results in accelerometer output), the sensing of the accelerometer of twice the numerical value of apogee along the inertial response line indicates that the missile is re-entering the horizontal plane that intersects the launch point (i.e., a missile, on its downward path, has returned to its launch elevation). Since the apogee is one of the known ballistic parameters and since the launch point/target elevation difference (if any) is also known, the system of the present invention as shown in FIGURE 2 may be utilized to provide an output signal at a desired arming and fusing altitude.

Figure 2:
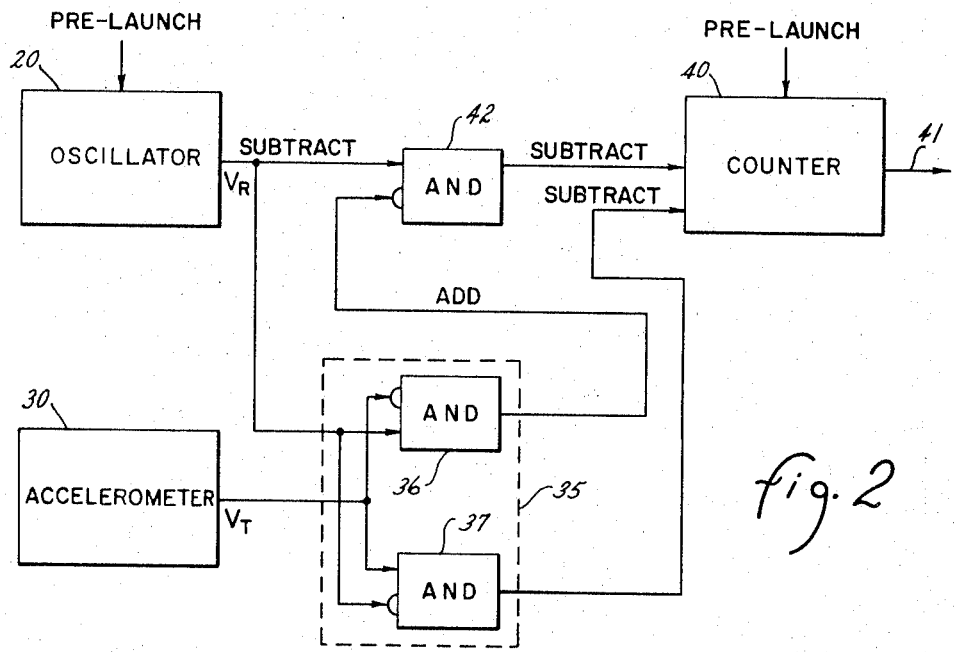
FIGURE 2 is a block diagram of the system of the present invention.

Referring to FIGURE 2, an oscillator 20 is adjusted to provide output pulses having a frequency corresponding to missile velocity at engine cut-off. The adjustment of the oscillator 20 to the desired pulse rate is indicated in FIGURE 2 as a pre-launch input; the pulse rate is representative of a predetermined anticipated velocity and may therefore be referred to as a reference velocity $V_R$. An accelerometer of the type described in Patent No. 2,861,789 and discussed above is shown at 30 producing an output comprising a series of pulses having a pulse rate representative of actual velocity measured along the trajectory of the missile axis; this actual velocity is thus an instantaneous measurement and may be represented by $V_T$. Under theoretical and ideal conditions, $V_R$ would equal $V_T$; however, missile drag results in a difference in the pulse rate. The output of the oscillator 20 and accelerometer 30 are applied to a difference generator shown in FIGURE 2 in broken lines 35. The difference generator 35 receives the pulses from the oscillator 20 and applies the pulses to an AND/gate 36 while inverting the same pulses and applying them to an AND/gate 37. Similarly, the pulses from the accelerometer 30 are applied to the AND/gate 37 and are inverted and applied to the AND/gate 36. Thus, the simultaneous occurrence of pulses from the oscillator 20 and the accelerometer 30 results in the blocking of both pulses in the AND/gates 36 and 37; whereas, the occurrence of a pulse from only the oscillator 20 results in a pulse output from AND/gate 36. Conversely, a pulse from the accelerometer 30 results in an output pulse from only the AND/gate 37.

An inertial altitude reference counter 40 is initially loaded as indicated in FIGURE 2 by a pre-launch input. The content of the counter initially represents a desired arming and fusing altitude the attainment of which results in an output pulse on a counter output line 41. The contents of the counter 40 may be determined by the following equation:

$$\text{Alt.} = 2(V_R \sin \theta)t \pm \text{desired deviation above or below the launch point elevations}$$

where Alt. equals the desired arming and fusing altitude; $\theta$ is the launch angle; $t$ is time; and $V_R$ is the pre-launch input representing the frequency described above. All of the above quantities are known prior to launching and, as may be seen from the previous discussion, represent a theoretical altitude without considering the effects of drag.

The pulses from the oscillator 20 are applied to an AND/gate 42 and subsequently applied to the counter 40 to substract from the contents of the counter (or decrement the counter). Thus, if only the oscillator 20 were present in the system, the counter 40 would ultimately be decremented to zero at a predetermined time after launch. The output of AND/gate 36 is inverted and applied to the AND/gate 42 to inhibit pulses from the AND/gate 42 when no pulse is present from AND/gate 36. The output of AND/gate 37 is applied directly to the counter 40 and is also used to substract from the contents of the counter.

The operation of the system of FIGURE 2 may now be described. The oscillator 20 is set at pre-launch with the reference velocity $V_R$; the counter is loaded at pre-launch with the numerical representation of altitude as described above. In flight, the oscillator 20 applies pulses through the AND/gate 42 to the counter 40 to decrement the latter. The pulses from the oscillator 20 are applied to the difference generator 35 together with the pulses generated by the accelerometer 30. An increase in the pulse rate of the pulses delivered by the accelerometer 30 to the difference generator 35 will result in the generation of pulses from the AND/gate 37 which will cause further substraction from the contents of the counter 40. A decrease in the pulse rate from the accelerometer 30 will result in the generation of pulses from the AND/gate 36 which will inhibit the pulses from the oscillator 20 in the AND/gate 42. The counter 40 will thus not be decremented. The system therefore compensates for drag and deviations of $V_T$ from $V_R$ to insure the proportionality of sine $\theta$ to the apogee of the actual trajectory.

In those instances where ranges and flight time cause local g. discrepancies, the pre-launch setting of the counter 40 may be programmed to compensate therefor; similarly, the counter contents may be altered to compensate for differences in elevation between the launch point and target. The oscillator 20 may be of any well known oscillator configuration for producing a train of pulses. The inertial altitude reference counter 40 may comprise any form of known counter capable of being preloaded and of receiving pulses from more than one source to be counted. In the embodiment chosen for illustration, the counter was chosen to be decremented by each input pulse; however, the counter may be arranged to increment rather than decrement so that attainment of a predetermined count will result in an output pulse.

It will be obvious to those skilled in the art that many modifications in the present invention may be made without departing from the spirit and scope thereof.

I claim:

1. An inertial height sensing system for mounting on a missile comprising: an oscillator for producing pulses having a predetermined pulse rate proportional to a reference velocity; an accelerometer having an acceleration axis longitudinally disposed in said missile, said accelerometer producing pulses having a pulse rate proportional to the actual velocity along said acceleration axis; a counter for storing a numerical value representing a predetermined altitude and responsive to pulses applied thereto for incrementally changing said numerical value, said counter responsive to a count of the pulses applied equal to said numerical value for generating an output signal; said oscillator connected to said counter for applying pulses thereto; and logic means connected to said oscillator, accelerometer, and counter responsive to a difference in pulse rate of said oscillator and said accelerometer for inhibiting the application of pulses from said pulse-generating means to said counter.

2. An inertial height sensing system as defined in claim 1, wherein said counter is decremented by each pulse applied thereto.

3. An inertial height sensing system for mounting in a missile comprising: a pulse-generating means producing pulses having a predetermined pulse rate proportional to a reference velocity; an accelerometer having an acceleration axis longitudinally disposed in said missile, said accelerometer producing pulses having a pulse rate proportional to the actual velocity along said acceleration axis; a counter for storing a numerical value representing a predetermined altitude and responsive to pulses applied thereto for incrementally changing said numerical value, said counter responsive to a count of the pulses applied equal to said numerical value for generating an output signal; said pulse-generating means connected to said counter for applying pulses thereto; a difference generator connected to said pulse-generating means and to said accelerometer producing first output pulses in response to a higher pulse rate from said pulse-generating means than from said accelerometer, and producing second output pulses in response to a higher pulse rate from said accelerometer than from said pulse-generating means; and means responsive to said first output pulses to inhibit the application of pulses to said counter from said pulse-generating means.

4. An inertial height sensing system for mounting in a missile comprising: an oscillator producing pulses having a predetermined pulse rate proportional to a reference velocity; an accelerometer having an acceleration axis longitudinally disposed in said missile, said accelerometer producing pulses having a pulse rate proportional to the actual velocity along said acceleration axis; a counter for storing a numerical value representing a predetermined altitude and responsive to pulses applied thereto for incrementally changing said numerical value, said counter responsive to a count of the pulses applied equal to said numerical value for generating an output signal; said oscillator connected to said counter; a difference generator connected to said oscillator and to said accelerometer producing first output pulses in response to a higher pulse rate from said oscillator than from said accelerometer, and producing second output pulses in response to a higher pulse rate from said accelerometer than from said oscillator; and means responsive to said first output pulses to inhibit the application of pulses to said counter from said oscillator.

5. An inertial height sensing system as defined in claim 4 wherein said counter is decremented by each pulse applied thereto.

6. An inertial height sensing system for mounting in a missile comprising: a pulse-generating means producing pulses having a predetermined pulse rate proportional to a reference velocity; an accelerometer having an acceleration axis longitudinally disposed in said missile, said accelerometer producing pulses having a pulse rate proportional to the actual velocity along said acceleration axis; a counter for storing a numerical value representing a predetermined altitude and responsive to pulses applied thereto for incrementally changing said numerical value, said counter responsive to a count of the pulses applied equal to said numerical value for generating an output signal; said pulse-generating means connected to said counter; a difference generator connected to said pulse-generating means and to said accelerometer producing first output pulses in response to a higher pulse rate from said pulse-generating means than from said accelerometer, and producing second output pulses in response to a higher pulse rate from said accelerometer than from said pulse-generating means; means responsive to said first output pulses to inhibit the application of pulses to said counter from said pulse-generating means; and means applying said second output pulses to said counter for incrementally changing said numerical value.

7. An inertial height sensing system for mounting in a missle comprising: an oscillator producing pulses having a predetermined pulse rate proportional to a reference velocity; an accelerometer having an acceleration axis longitudinally disposed in said missile, said accelerometer producing pulses having a pulse rate proportional to the actual velocity along said acceleration axis; a counter for storing a numerical value representing a predetermined altitude and responsive to pulses applied thereto for incrementally changing said numerical value, said counter responsive to a count of the pulses applied equal to said numerical value for generating an output signal; said oscillator connected to said counter; a difference generator connected to said oscillator and to said accelerometer producing first output pulses in response to a higher pulse rate from said oscillator than from said accelerometer, and producing second output pulses in response to a higher pulse rate from said accelerometer than from said oscillator; means responsive to said first output pulses to inhibit the application of pulses to said counter from said oscillator; and means applying said second output pulses to said counter for incrementally changing said numerical value.

8. An inertial height sensing system for mounting in a missile comprising: a pulse-generating means producing pulses having a predetermined pulse rate proportional to a reference velocity; an accelerometer having an acceleration axis longitudinally disposed in said missile, said accelerometer producing pulses having a pulse rate proportional to the actual velocity along said acceleration axis; a counter for storing a numerical value representing a predetermined altitude and responsive to pulses applied thereto for incrementally changing said numerical value, said counter responsive to a count of the pulses applied equal to said numerical value for generating an output signal; said pulse-generating means connected to said counter; a difference generator connected to said pulse-generating means and to said accelerometer producing first output pulses in response to a higher pulse rate from said pulse-generating means than from said accelerometer, and producing second output pulses in response to a higher pulse rate from said accelerometer than from said pulse-generating means; said counter connected to said difference generator and responsive to said first output pulse for incrementally changing said numerical value in one numerical direction and responsive to said second output pulses for incrementally changing said numerical value in an opposite numerical direction.

References Cited

UNITED STATES PATENTS 3,080,521    3/1963    Euker et al. _____ 73—179 XR

LOUIS R. PRINCE, *Primary Examiner.*

DONALD O. WOODIEL, *Assistant Examiner.*

U.S. Cl. X.R.

73—490